United States Patent [19]
Taguchi et al.

[11] Patent Number: 5,577,768
[45] Date of Patent: Nov. 26, 1996

[54] AIR BAG DEVICE HAVING A MINIMIZED CONE DEPTH

[75] Inventors: Masahiro Taguchi, Aichi-ken; Kazutaka Katoh, Okazaki; Shigenori Kobayashi, Aichi-ken; Naoki Nakane, Toyota; Kazuo Sakakibara, Okazaki; Masayuki Ohashi, Anjo, all of Japan

[73] Assignee: Nippondenso Co., Ltd., Kariya, Japan

[21] Appl. No.: 233,882

[22] Filed: Apr. 26, 1994

[30] Foreign Application Priority Data

| Apr. 28, 1993 | [JP] | Japan | 5-102201 |
| Apr. 28, 1993 | [JP] | Japan | 5-102874 |
| Jul. 19, 1993 | [JP] | Japan | 5-178069 |

[51] Int. Cl.⁶ ................................. B06R 21/16
[52] U.S. Cl. ................ 280/735; 280/731; 280/728.2
[58] Field of Search ............... 280/735, 731, 280/728.1, 741, 728.2

[56] References Cited

U.S. PATENT DOCUMENTS

| 4,974,873 | 12/1990 | Kaiguchi et al. | 280/735 |
| 5,152,549 | 10/1992 | Aird | 280/731 X |
| 5,178,409 | 1/1993 | Hiramitsu et al. | 280/735 |
| 5,201,541 | 4/1993 | Jones et al. | 280/735 |
| 5,257,816 | 11/1993 | Sugimoto et al. | 280/735 |
| 5,284,359 | 2/1994 | Baba | 280/743.1 |
| 5,382,046 | 1/1995 | Cuevas | 280/731 |
| 5,398,965 | 3/1995 | Giurlando et al. | 280/735 |

FOREIGN PATENT DOCUMENTS

| 2-28037 | 1/1990 | Japan . |
| 3-157241 | 7/1991 | Japan . |
| 4-342638 | 11/1992 | Japan . |

*Primary Examiner*—Christopher P. Ellis
*Attorney, Agent, or Firm*—Cushman, Darby & Cushman

[57] ABSTRACT

An inflater and a control unit are integrally formed so that connector cables for electrically connecting the inflater and the control unit can be shortened to the minimum required length. In some cases, the inflater and the control unit are directly connected by soldering their terminals, and a space for disposing the connector cables is not provided in a steering wheel. Thus, the cone depth can be made as small as possible.

18 Claims, 17 Drawing Sheets

5,577,768

AIR BAG DEVICE HAVING A MINIMIZED CONE DEPTH

BACKGROUND OF THE INVENTION

The present invention relates to an air bag device comprising a bag which develops to protect a person on board during a collision of a vehicle, an inflater which generates gas for expanding the bag, and an electronic control unit which operates the inflater.

Recently, an air bag device which expands a bag to protect a person on board during a collision of a vehicle, an inflater which generates gas to expand the bag, and an electronic control unit (hereinafter referred to as ECU) including an electronic acceleration sensor that performs collision judgements of the vehicle on the basis of signals from the sensor, are provided in a steering wheel such that the electronic acceleration sensor for detecting the collision of the vehicle is in corporated in the steering wheel.

More specifically, as shown in FIG. 22, a housing 3 containing an ECU is fastened on a steering wheel 6 by bolts 5, and a bag 2 is clamped between an outer peripheral portion 1a of an inflater 1 and a retainer 7. The outer peripheral portion of the inflater 1, the bag 2 and the retainer 7 are fastened on a stay 8, and the stay 8 and a pad 9 are fixed on the steering wheel 6.

OBJECT AND SUMMARY OF THE INVENTION

It is an object of the present invention to provide an air bag device in which an inflater and an ECU are housed in a pad, and a cone depth (a distance from the surface of the pad to a steering wheel) can be made as small as possible.

Therefore, this invention employs an air bag device in which an inflater which generates gas for developing a bag, and an ECU which includes an electronic acceleration sensor for detecting a collision of a vehicle and performs collision judgement and so forth in response to signals from the sensor, are housed in a cover-like pad, characterized in that a housing which contains the ECU and the inflater are directly attached to each other.

In the air bag device according to the invention with the above-described structure, the housing containing the ECU and the inflater are directly attached to each other so that connector cables for electrically connecting the ECU and the inflater can be shortened to the minimum required length. Moreover, in some cases, because the ECU and the inflater (or an initiator element on it) can be directly connected by soldering their terminals, a space for disposing the connector cables need not be provided in the pad. Thus, the cone depth can be made as small as possible.

DETAILED DESCRIPTION OF PREFERRED EMBODIMENTS

Figure 1:
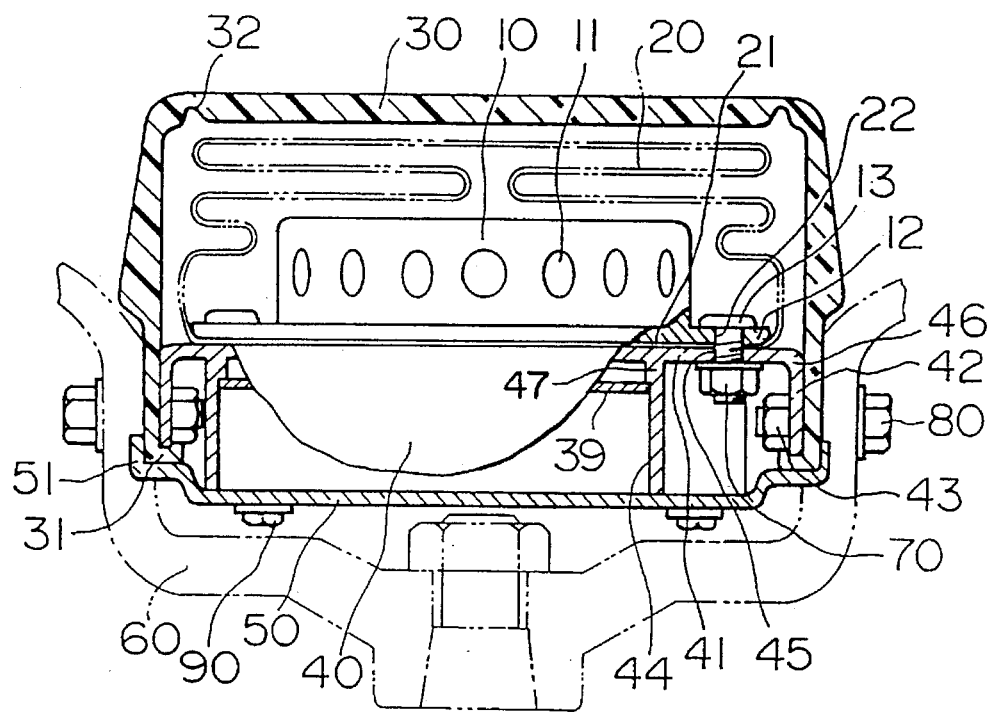
FIG. 1 is a cross-sectional view showing a first embodiment of the present invention.

FIG. 1 is a cross-sectional view showing a first embodiment of the present invention.

Referring to FIG. 1, a bag 20 which inflates for protecting a person on board a vehicle defines an insertion hole 21 in which an inflater 10 is inserted, and a plurality of fixing holes 22. The insertion hole 21 is formed in the bottom of the bag 20, and the fixing holes 22 are formed around the hole 21. The inflater 10 which generates gas to expand or develop the bag 20 is provided with a plurality of gas injection holes 11 and a flange portion 12 including a plurality of fastening bolts 13. By use of nuts 70, the bag 20 is fastened between the flange portion 12 and a flat surface 41 of a housing 44 which will be described later.

An electronic control unit (ECU) 40 disposed on the housing 44 having the integrally formed inflater mounting surface 41 includes an electronic acceleration sensor for detecting a collision of the vehicle, and a control circuit for performing collision judgements and so forth on the basis of signals from the sensor. This control circuit is provided on a circuit board 39 fixed an ECU control circuit mounting surface 47 of 44 by screw-fasteners (not shown).

An outer peripheral mounting portion 42 extending, preferably in a perpendicular direction, from the flat surface 41 of the housing 44 is bent, as shown in FIG. 1, and nuts 43 for fastening the housing 44 on a steering wheel 60 are welded or integrally formed on the outer peripheral mounting portion 42. A cover 50 made of a metallic plate is fixed on the housing 44 by screw-fasteners 90, and an outer peripheral portion 51 of the cover 50 is bent, as shown in FIG. 1, to thereby cover the outer peripheries of fixing portions 31 of a pad 30 in the final assembling step.

Figure 2:
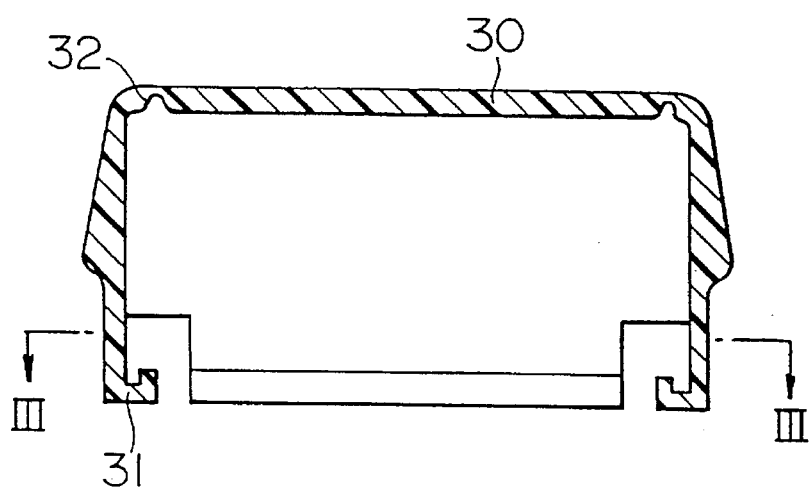
FIG. 2 is a cross-sectional view showing the structure of a pad 30 in the first embodiment.
Figure 3:
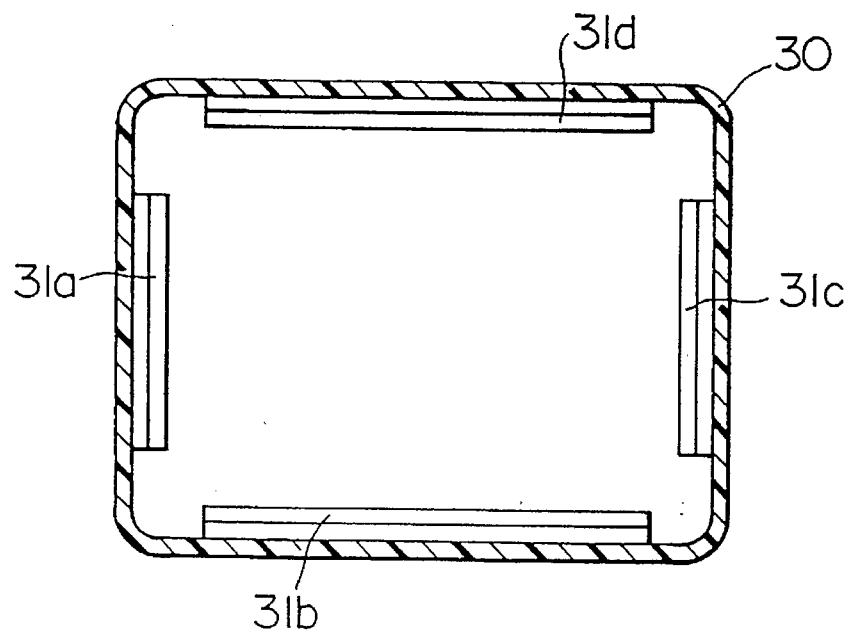
FIG. 3 is a cross-sectional view showing the pad 30 in the first embodiment, taken along the line III—III.

As shown in FIG. 2, the pad 30 includes a rip line 32 along which the pad 30 ruptures when the bag 20 inflates, and the fixing portions 31 at the ends of the pad 30 have a cross-sectional shape like a hook projecting into the bag 30. As shown in FIG. 3 which is a cross-sectional view of the pad 30 taken along the line III—III, the fixing portions 31a, 31b, 31c and 31d having the hook-like cross-sectional shape are formed on the inner surface of the pad 30.

The fixing portions 31a, 31b, 31c and 31d of the pad 30 are formed only on flat portions of the inner surface of the pad 30, not on corner portions of the pad 30. Consequently, when the pad 30 is attached to the housing 44, the fixing portions 31 easily deform elastically outwardly, and when the pad 30 is closely fitted on the housing 44, a sufficient strength can be obtained.

Figure 4:
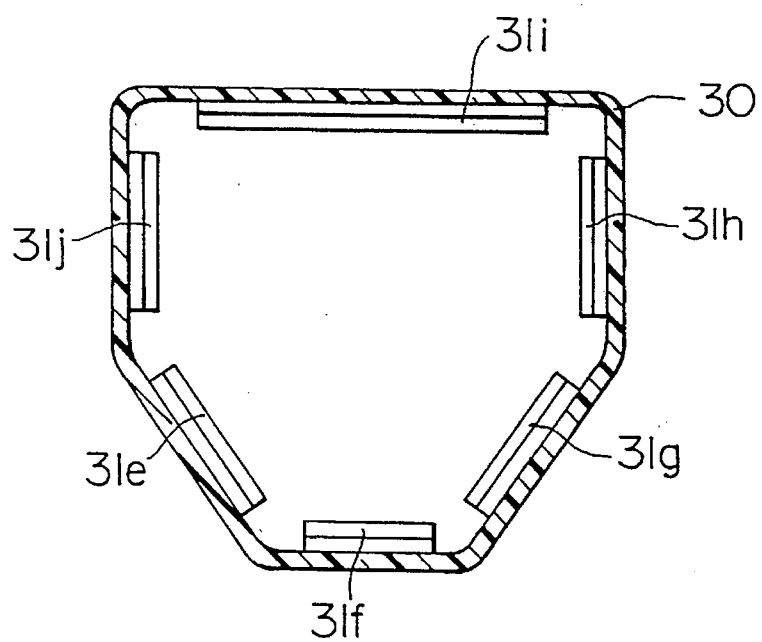
FIG. 4 is a cross-sectional view showing another configuration of the pad 30.

The shape of the pad 30, may not only be the rectangular shape shown in FIG. 3 also a pentagonal shape shown in FIG. 4 may also be employed. In this case, fixing portions 31e, 31f, 31g, 31h and 31i are formed only on flat portions in substantially the same manner as shown in FIG. 3, so that similar effects to the foregoing ones can be produced.

The air bag device having the above-described structure is assembled in the following manner.

First, the inflater 10 is inserted into the insertion hole 21 in the bottom of the bag 20, and the fastening bolts 13 provided on the flange portion 12 of the inflater 10 are fitted through the fixing holes 22 of the bag 20. At this time, the bag 20 is folded into a shape generally fitted to the internal shape of the pad 30.

Then, the fastening bolts 13 of the inflater 10 are inserted in fixing holes 45 formed in the inflater mounting surface 41 of the housing 44. While the bag 20 is held between the inflater 10 and the housing 44 of the ECU 40, the inflater 10 is fixed on the housing 44 by tightening the nuts 70.

Subsequently, the pad 30 is placed over the folded bag 20 to cover it. When the fixing portions 31 of the pad 30 are brought into contact with shoulder portions 46 of the inflater mounting surface 41 and further pressed, the fixing portions 31 of the pad 30 slidingly move on the outer peripheral mounting portion 42 of the housing 44 while elastically deforming outwardly until the fixing portions 31 of the pad 30 having the hook-like cross-sectional shape are closely fitted and secured on the outer peripheral mounting portion 42 of the housing 44, as shown in FIG. 1. At this time, the pad 30 is attached to the housing 44 such that the pad 30 receives an upward reaction force of the folded bag 20, as viewed in FIG. 1.

Next, the inflater 10 and the ECU 40 in this state are electrically connected to each other. A hole (not shown) is formed substantially in the center of the inflater mounting surface 41 of the housing 44, and squib (initiator element) terminals (not shown) of the inflater 10 and the circuit board 39 are connected through connector cables or by soldering, thereby electrically connecting the inflater 10 and the ECU 40.

Finally, the cover 50 is placed over the ECU 40 and fixed on the housing 44 by the screw-fasteners 90. Since the outer peripheral portion 51 of the cover 50 is bent, as shown in FIG. 1, it covers the outer peripheries of the fixing portions 31 of the pad 30. Therefore, although an internal pressure during expansion of the pad 30 is applied to the fixing portions 31 of the pad 30 at an early stage of the displayments of the bag 20, the fixing portions 31 will not come off.

In this state, an air bag module is completed. By screwing bolts 80 into the nuts 43 provided on the inner surface of the outer peripheral mounting portion 42 of the housing 44, from the outside of the steering wheel 60, the air bag module is fixed on the steering wheel 60.

As described so far, in the air bag module of the first embodiment, the inflater 10 is integrally provided with the ECU 40, so that the connector cable for electrically connecting the inflater 10 and the ECU 40 can be shortened to the minimum required length, and that in some cases when terminals of these two components can be connected by soldering, it is not necessary to provide a space for the connector cables in the steering wheel 60, thereby decreasing the cone depth to the minimum.

Moreover, as compared with the conventional air bag device described before, the air bag module of the first embodiment involves no caulking work and has less component parts, so that the assembling efficiency can be largely improved.

Figure 23:
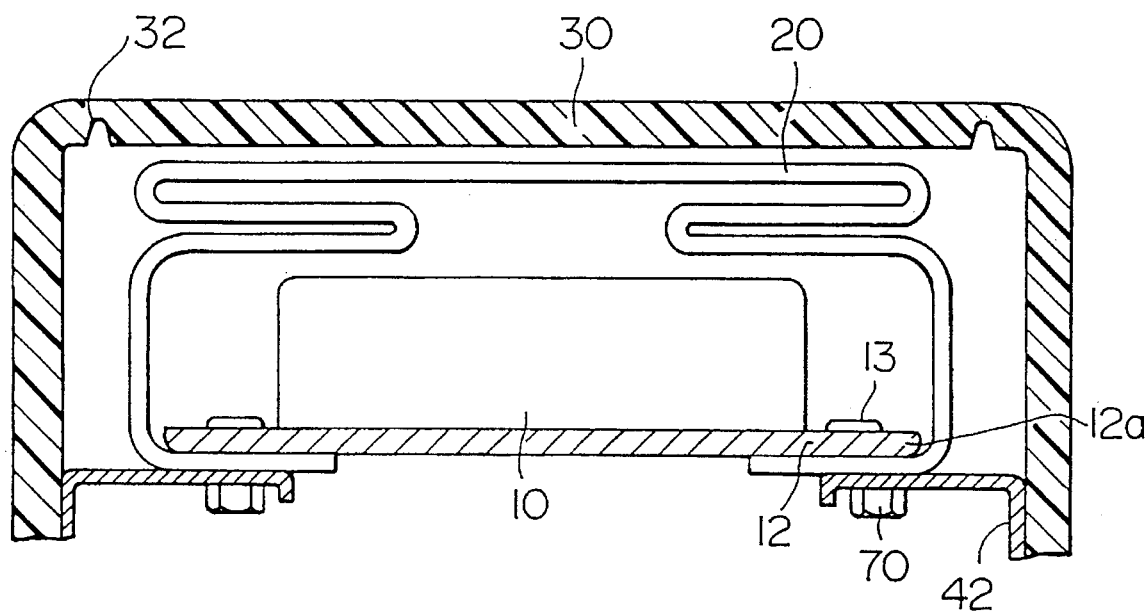
FIG. 23 is a partial enlarged cross-sectional view showing a bag clamping portion in the first embodiment shown in FIG. 1.

In the first embodiment, as shown in FIG. 23 which is a partial enlarged view of FIG. 1, ends 12a of the flange portion 12 of the inflater 10 are curved. The curved ends 12a are sag portions resulting from cutting work of a casing of the inflater 10. With these curved ends 12a, flatness of the attachment portion which is an important factor for clamping the bag 20 can be improved, and also, stress on the portion of the bag 20 in contact with the flange portion 12 of the inflater 10 can be lessened, thus preventing rupture of the bag 20. Besides, by utilizing the sag portions resulting from cutting work for shaping the ends of the flange portion 12, cutting and shaping can be simultaneously performed.

Figure 24:
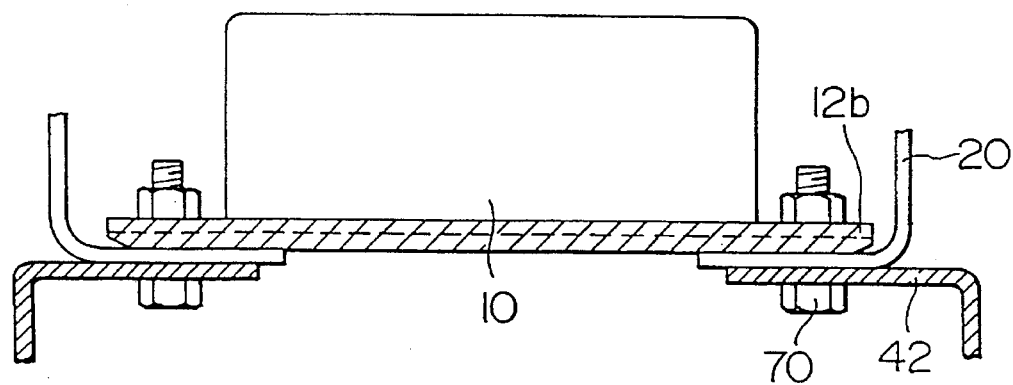
FIG. 24 is a partial enlarged cross-sectional view showing another embodiment of the bag clamping portion.

The ends of the flange portion 12 of the inflater 10 may have a shape shown in FIG. 24 other than the shape shown in FIG. 23. More specifically, in an air bag device shown in FIG. 24, ends 12b of a flange portion 12 of an inflater 10 are chamfered. With such a structure, substantially the same effects as the device shown in FIG. 23 can be produced.

A second embodiment of the invention will now be described.

Figure 5:
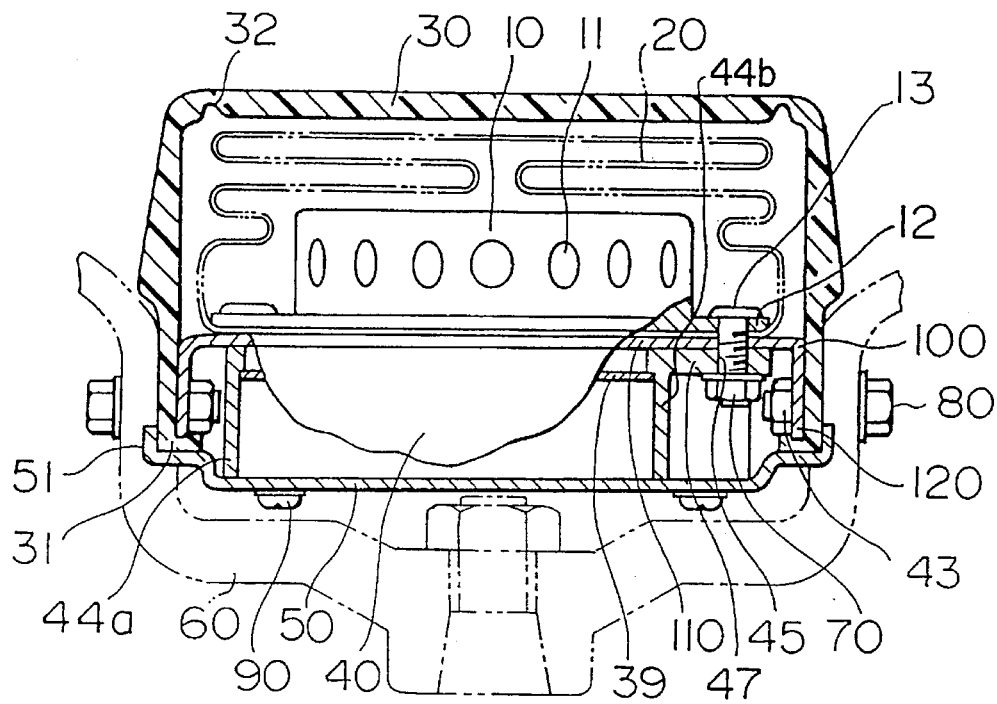
FIG. 5 is a cross-sectional view showing a second embodiment of the invention.

FIG. 5 is a cross-sectional view showing the second embodiment. In FIG. 5, the same reference numerals as those in FIG. 1 denote common component parts.

In the above-described first embodiment, the housing 44 and the inflater mounting surface 41 are formed integrally or monolithically with each other. In the second embodiment, however, as shown in FIG. 5, a housing 44a having a mounting portion 44b is a molded article, and a bottom plate 110 having a shoulder portion 100 is made of a metallic plate, so as to improve the moldability of the housing 44a. The electronic control unit control circuit 39 is mounted to the mounting portion 44b.

The assembling procedures of the second embodiment are: clamping a bag 20 between an inflater 10 provided in the bag 20 and the bottom plate 110; and fastening these components and a flange portion of the housing 44a at once by fastening bolts 13 of the inflater 10 and nuts 70. After an air bag module is completed, bolts 80 are screwed into nuts 43 provided on the inner surface of an outer peripheral portion 120 of the housing 44a, from the outside of a steering wheel 60, thereby fixing the air bag module on the steering wheel 60.

As a result, the cone depth can be decreased to the minimum in substantially the same manner as the first embodiment, and also, the assembling efficiency can be improved to a greater degree than the first embodiment.

A third embodiment of the invention will now be described.

Figure 6:
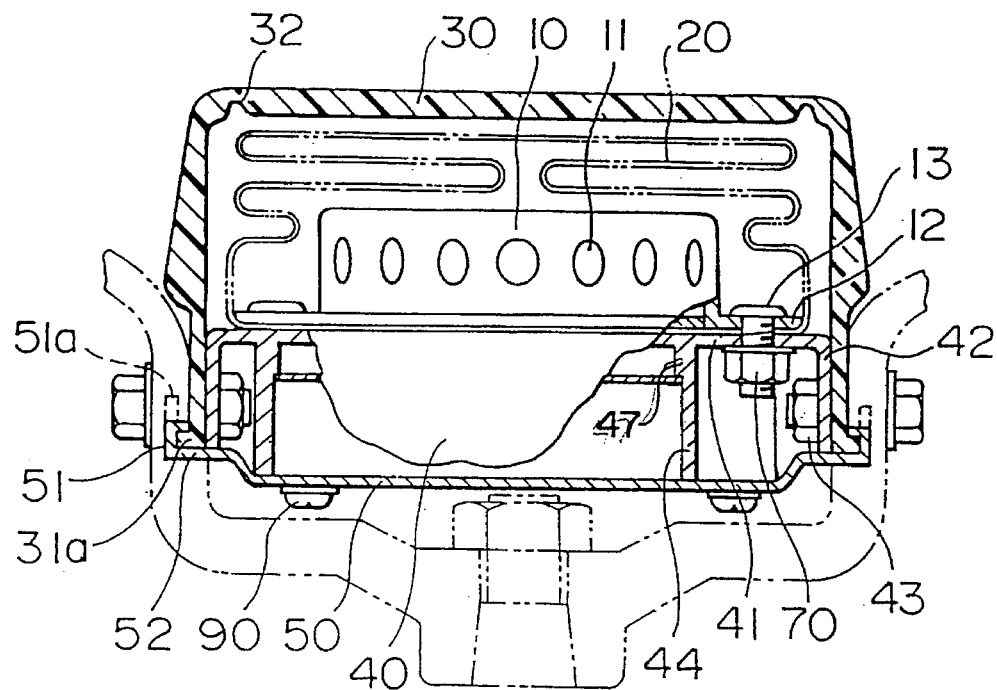
FIG. 6 is a cross-sectional view showing a third embodiment of the invention.

FIG. 6 is a cross-sectional view showing the third embodiment. In FIG. 6, the same reference numerals as those in FIG. 1 denote common component parts.

In the first embodiment, the fixing portions 31 of the pad 30 have the hook-like cross-sectional shape projecting from the pad 30 inwardly. In the third embodiment, however, as shown in FIG. 6, fixing portions 31a of a pad 30 have an L-shaped cross-sectional shape projecting from the pad 30 outwardly, thereby improving the moldability.

The assembling procedures of the third embodiment are: clamping a bag 20 between an inflater 10 and an inflater mounting surface 41 of a housing 44; connecting the inflater 10 with an ECU 40 electrically; and fastening a cover 50 by screw-fasteners 90.

At first, an outer peripheral portion 51a of the cover 50 has an L-shaped cross-sectional shape opposite to the L-shaped cross-sectional shape of the fixing portions 31a of the pad 30. The outer peripheral portion 51a of the cover 50 and an outer peripheral mounting portion 42 of the inflater mounting surface 41 have a gap 52 interposed therebetween to receive the fixing portions 31a of the pad 30 having the L-shaped cross-sectional shape. The pad 30 is placed over the cover 50 in this state from above, as viewed in FIG. 6, and is sustained when the fixing portions 31a of the pad 30 abut against the cover 50. Finally, the outer peripheral portion 51a of the cover 50 is caulked, to thereby form an outer peripheral portion 51 of the cover 50 having a U-shaped cross-sectional shape which generally encloses the L-shaped cross-sectional shape of the fixing portions 31a of the pad 30.

Thus, the cone depth can be decreased to the minimum in substantially the same manner as the first embodiment, and also, the assembling efficiency can be improved to a greater degree than the first embodiment.

A fourth embodiment of the invention will now be described.

Figure 7:
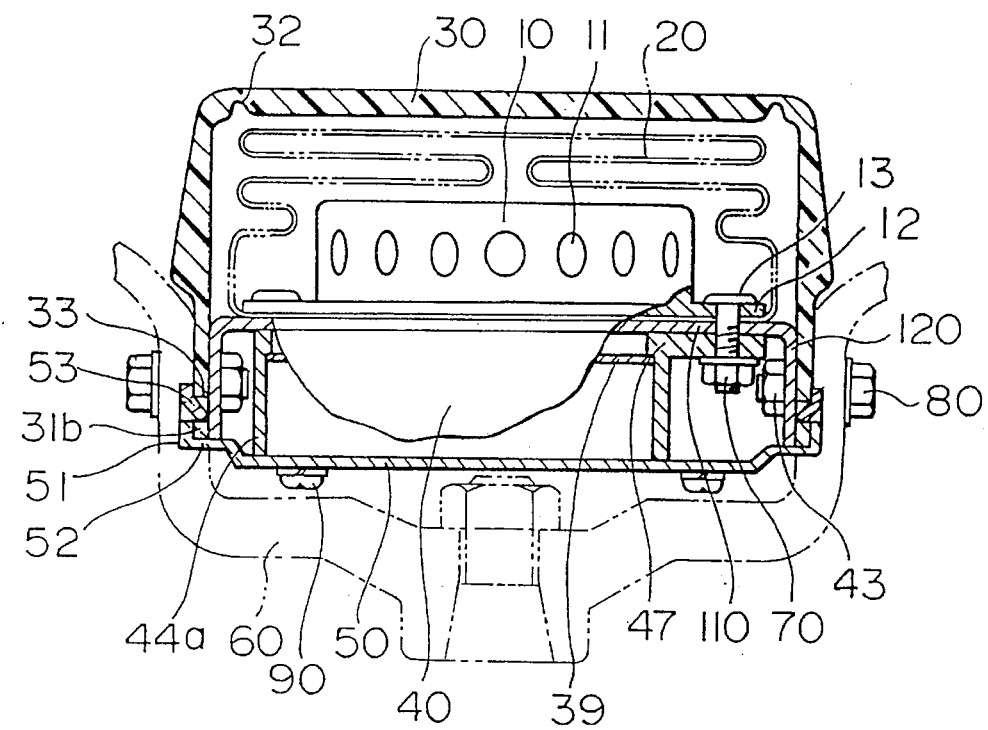
FIG. 7 is a cross-sectional view showing a fourth embodiment of the invention.
Figure 8:
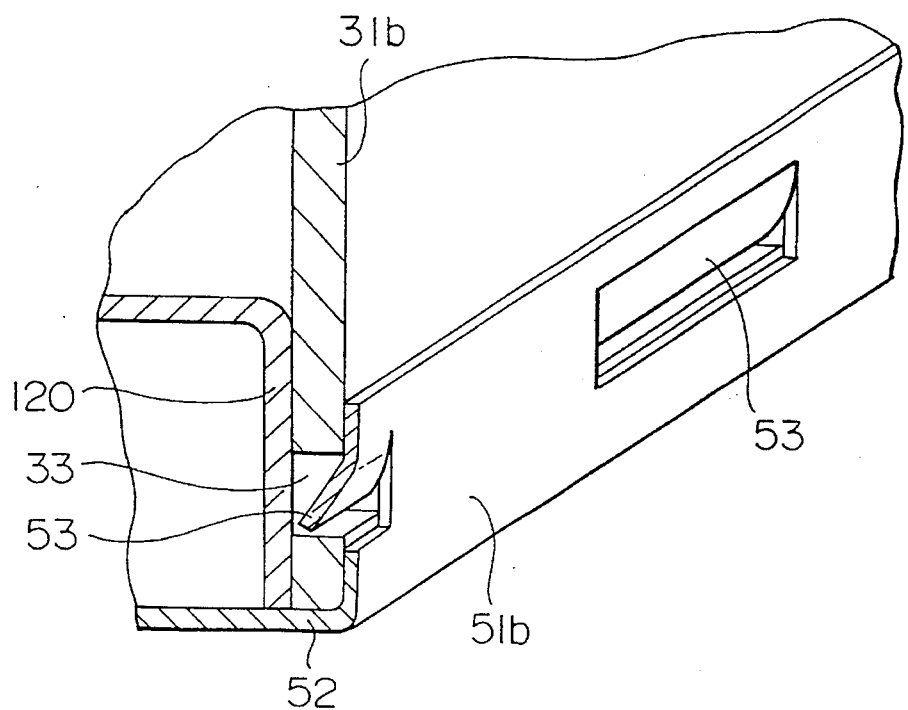
FIG. 8 is an enlarged cross-sectional view showing a fixing portion of a pad in the fourth embodiment.

FIG. 7 is a cross-sectional view showing the fourth embodiment, and FIG. 8 is an enlarged cross-sectional view showing a fixing portion of a pad in the fourth embodiment. In FIGS. 7 and 8, the same reference numerals as those in FIG. 1 or 5 denote common component parts.

In the fourth embodiment, fixing portions 31b of a pad 30 have a straight shape. Also, a plurality of holes 33 are formed in the fixing portions 31b, and a plurality of engaging parts 53 are provided on an outer peripheral portion 51b of a cover 50 and located at positions corresponding to the holes 33 formed in the pad 30.

The assembling procedures of the fourth embodiment are: clamping a bag 20 between an inflater 10 and an inflater mounting surface 41 of a housing 44; and fastening the cover 50 by screw-fasteners 90. In this state, the pad 30 is placed in a gap 52 from above, as viewed in FIG. 7, and the pad 30 is further pressed until the engaging parts 53 provided on the outer peripheral portion 51b of the cover 50 beforehand are elastically fitted in the holes 33 formed in the fixing portions 31b of the pad 30, thereby completing the attachment of the pad 30.

As a result, the assembling procedures of an air bag device can be largely improved.

In the fourth embodiment, the assembling procedures are not limited to the above-described procedures, and the engaging parts 53 provided on the outer peripheral portion 51b of the cover 50 may be fitted in the holes 33 formed in the fixing portions 31b of the pad 30 by pressing the engaging parts 53.

Figure 9:
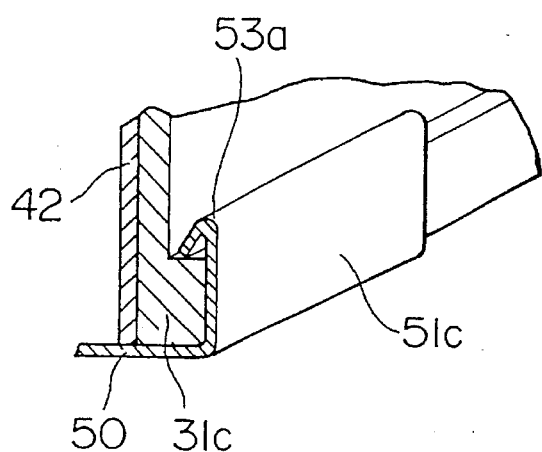
FIG. 9 is a partial enlarged cross-sectional view showing a fifth embodiment of the invention.
Figure 10:
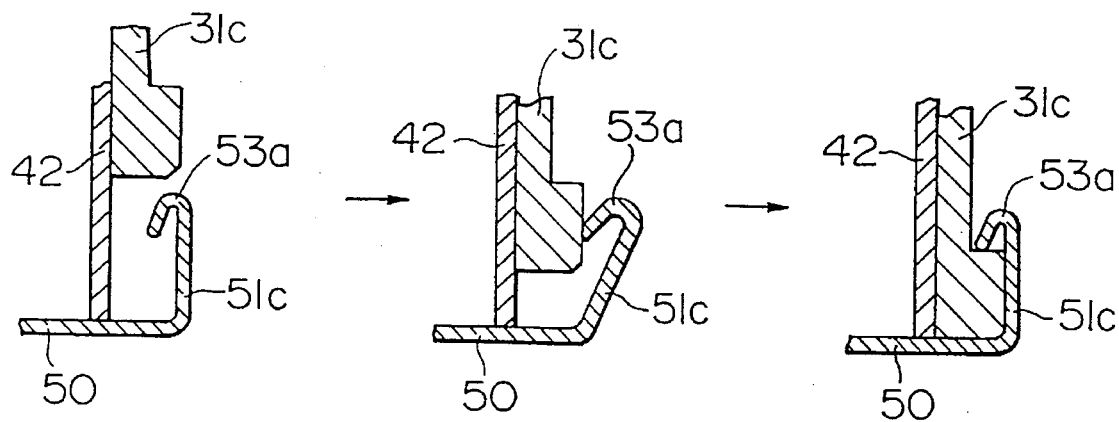
FIG. 10 is a partial enlarged cross-sectional view for explaining assembling procedures in the fifth embodiment.

FIG. 9 is a partial enlarged cross-sectional view showing a fifth embodiment of the invention, and FIG. 10 is a diagram for explaining assembling procedures in the fifth embodiment. In FIGS. 9 and 10, the same reference numerals as those in FIG. 1 denote common component parts.

In the fifth embodiment, fixing portions 31c of a pad 30 have a substantially L-shaped cross-sectional shape projecting from the pad 30 outwardly, and engaging parts 53a of an outer peripheral portion 51c of a cover 50 have a hook-like cross-sectional shape bent inwardly and are located at a plurality of positions on the outer peripheral portion 51c of the cover 50.

The assembling procedures of the fifth embodiment are: clamping a bag 20 between an inflater 10 and an inflater mounting surface 41 of a housing 44; and fastening the cover 50 by screw-fasteners 90. In this state, by pressing the pad 30 from above, the fixing portions 31c of the pad 30 abut against the cover 50, and by further pressing the pad 30, the outer peripheral portion 51c of the cover 50 is elastically deformed. Then, by pressing the pad 30 still further, the outer peripheral portion 51c of the cover 50 recovers the original shape, and the fixing portions 31c of the pad 30 are engaged with the engaging parts 53a of the outer peripheral portion 51c, thereby completing the assembly.

Thus, the cone depth can be decreased to the minimum in substantially the same manner as the first embodiment, and also, the assembling efficiency can be improved to a greater degree than the first embodiment.

A sixth embodiment of the invention will now be described.

Figure 11:
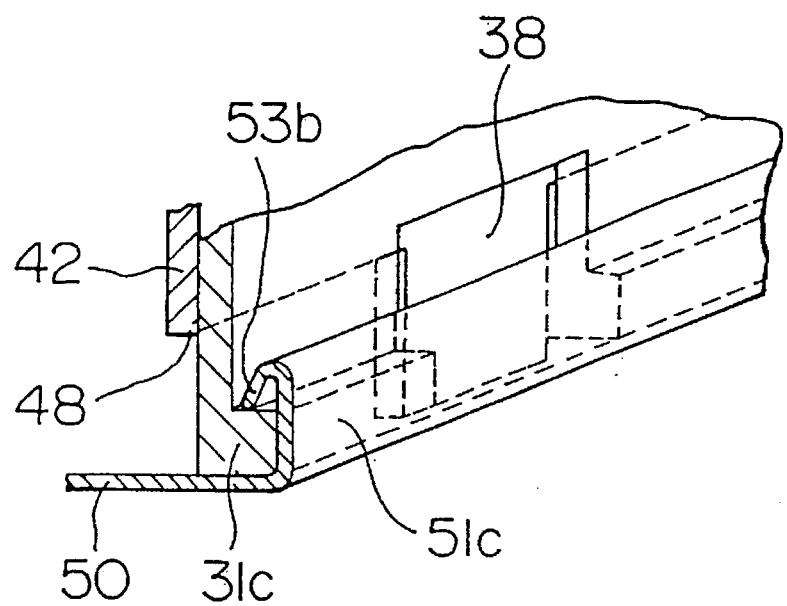
FIG. 11 is a partial enlarged cross-sectional view for explaining assembling procedures in a sixth embodiment of the invention.
Figure 11:
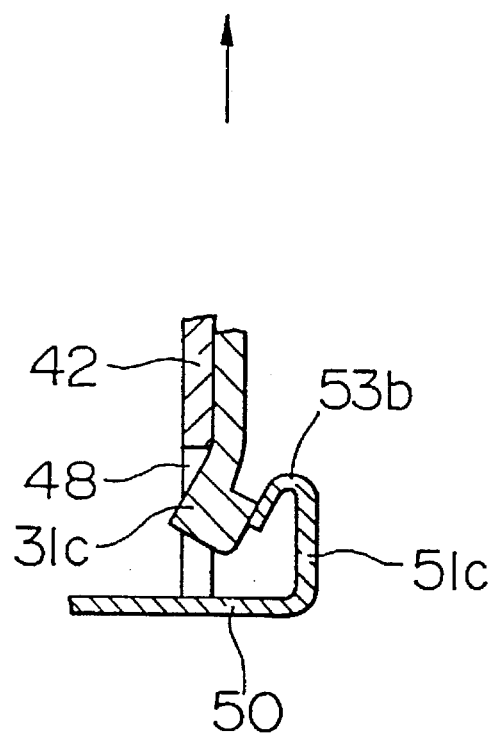

FIG. 11 is a partial enlarged cross-sectional view showing the sixth embodiment. In FIG. 11, the same reference numerals as those in FIG. 1 denote common component parts.

In the sixth embodiment, in substantially the same manner as the fifth embodiment, fixing portions 31c of a pad 30 have a substantially L-shaped cross-sectional shape projecting from the pad 30 outwardly, and are divided into a plurality of sections by gaps 38. Also, engaging parts 53b of an outer peripheral portion 51c of a cover 50 which is highly rigid have a hook-like cross-sectional shape bent inwardly, and are located at a plurality of positions on the outer peripheral portion 51c of the cover 50. In this embodiment, reception holes 48 are formed in an outer peripheral mounting portion 42 of an inflater mounting surface 41 of a housing 44 (FIG. 1) at positions corresponding to the fixing portions 31c of the pad 30.

The assembling procedures of the sixth embodiment are: clamping a bag 20 between an inflater 10 and the inflater mounting surface 41 of the housing 44; and fastening the cover 50 by screw-fasteners 90. In this state, when the pad 30 is pressed from above, the outer peripheral portion 51c of the cover 50 is not deformed because the rigidity is high. However, the fixing portions 31c of the pad 30 at a plurality of positions abut against the engaging parts 53b of the cover 50, and when the pad 30 is further pressed, the fixing portions 31c are elastically deformed to extend into the reception holes 48 formed in the outer peripheral mounting portion 42 of the inflater mounting surface 41 of the housing 44 (FIG. 1).

When the pad 30 is still further pressed, the fixing portions 31c of the pad 30 are detached from the engaging parts 53b of the cover 50 and recover the original shape. Then, the fixing portions 31c of the pad 30 are engaged with the engaging parts 53b of the outer peripheral portion 51c, thereby completing the assembly.

A seventh embodiment of the invention will now be described.

Figure 12:
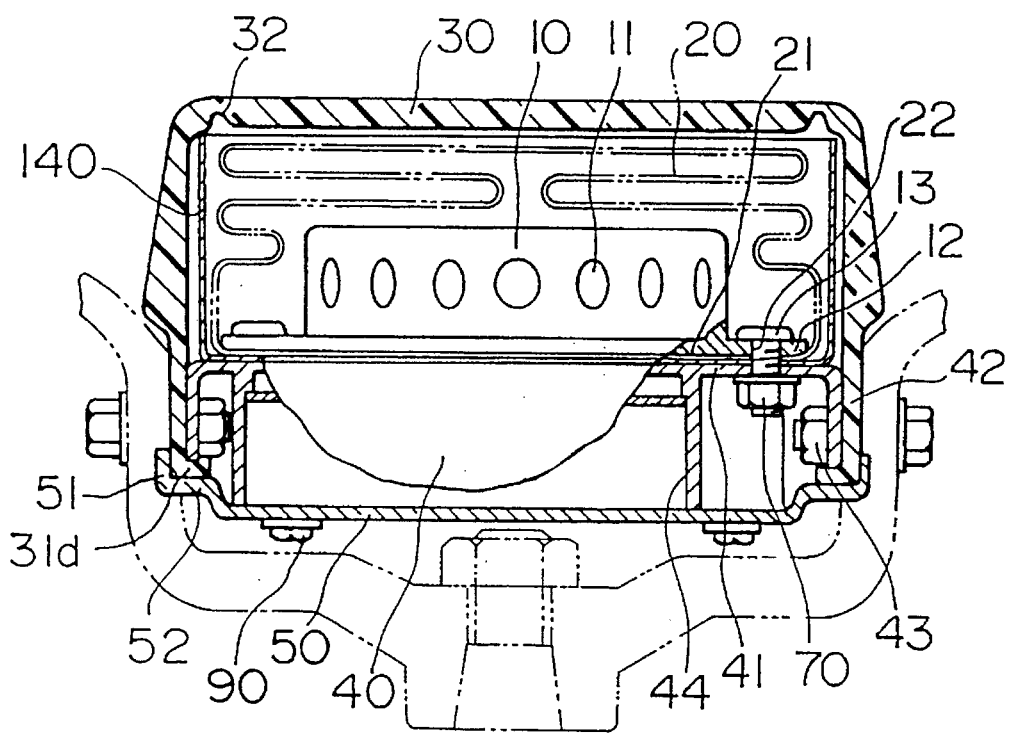
FIG. 12 is a cross-sectional view showing a seventh embodiment of the invention.

FIG. 12 is a cross-sectional view showing the seventh embodiment. In FIG. 12, the same reference numerals as those in FIG. 1 or 6 denote common component parts.

Figure 13:
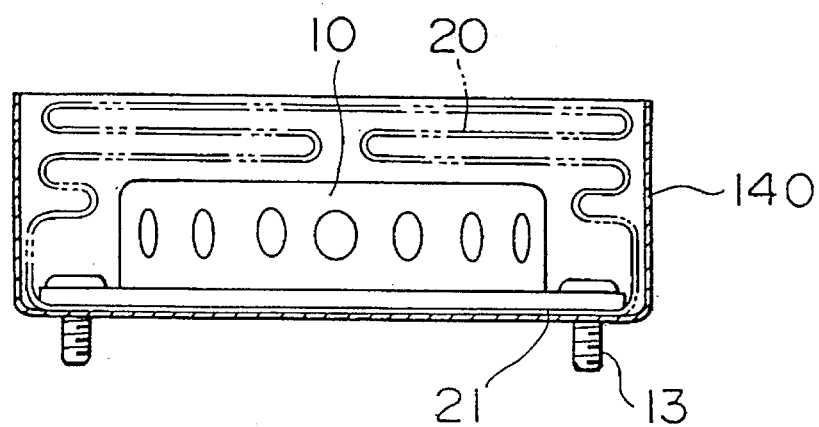
FIG. 13 is a partial enlarged cross-sectional view showing an inflater and its neighboring portion in the seventh embodiment.

In the seventh embodiment, a container 140 is provided around a bag 20 folded in accordance with the internal shape of a pad 30. The assembling procedures of the seventh embodiment are as follows: An inflater 10 is inserted from an insertion hole 21 formed in the bottom of the bag 20, and fastening bolts 13 provided on a flange portion 12 of the inflater 10 are fitted through fixing holes 22 of the bag 20. At this time, the bag 20 is folded into a shape generally fitted to the internal shape of the pad 30. Subsequently, the bag 20 is disposed in the container 140 shaped in accordance with the internal shape of the pad 30, thus providing a structure shown in FIG. 13 which is a partial enlarged cross-sectional view of the inflater 10 and its neighboring portion. This structure is attached to a housing 44 of an ECU 40, and further, the pad 30 is attached to them. Fixing portions 31d of the pad 30 have an L-shaped cross-sectional shape bent from the pad 30 inwardly.

As a result, it is possible to prevent a part of the folded bag 20 from catching on the pad 30 and an outer peripheral mounting portion of the ECU 40 when the pad 30 is attached. If necessary, the upper surface of the container 140 may be taped.

An eighth embodiment of the invention will now be described.

Figure 14:
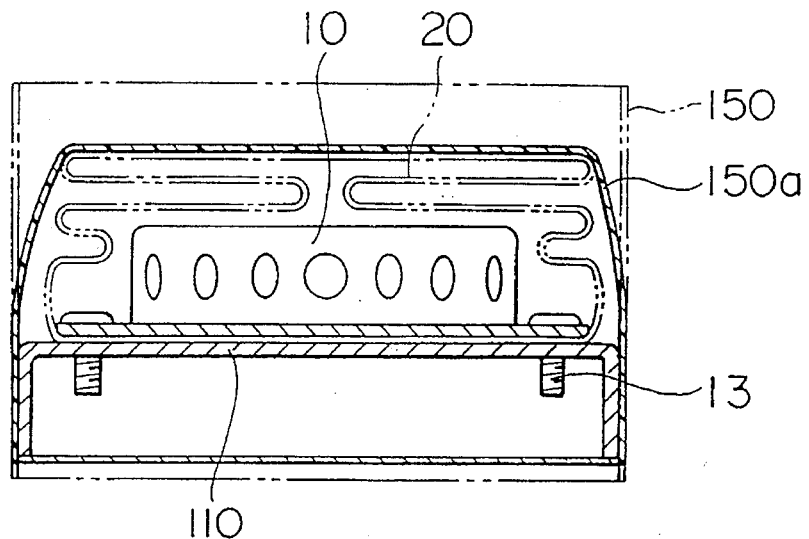
FIG. 14 is a partial enlarged cross-sectional view showing an inflater and its neighboring portion in an eighth embodiment of the invention.

FIG. 14 is a partial enlarged cross-sectional view showing the eighth embodiment. In FIG. 14, the same reference numerals as those in FIG. 5 denote common component parts.

In the eighth embodiment, in substantially the same manner as the seventh embodiment, an equivalent member to the container 140 in the seventh embodiment is provided for a folded bag 20 in order to improve the assembling efficiency.

The assembling procedures of the eighth embodiment are as follows: After the associated procedures described in the seventh embodiment, the bag 20 is folded into a shape generally fitted to the internal shape of a pad 30, and a bottom plate 110 of an ECU is attached to the bag 20. Then, a thermally contractive film (for example, a film made of vinyl chloride) 150 is placed around the bag 20 and the bottom plate 110, and contracted by heating it, thereby forming a cover 150a.

Thus, unfolding of the bag 20 can be prevented to improve the assembling efficiency. Also, catching of the bag 20 at the time of attachment of the pad 30 can be prevented without fail.

A ninth embodiment of the invention will now be described.

Figure 15:
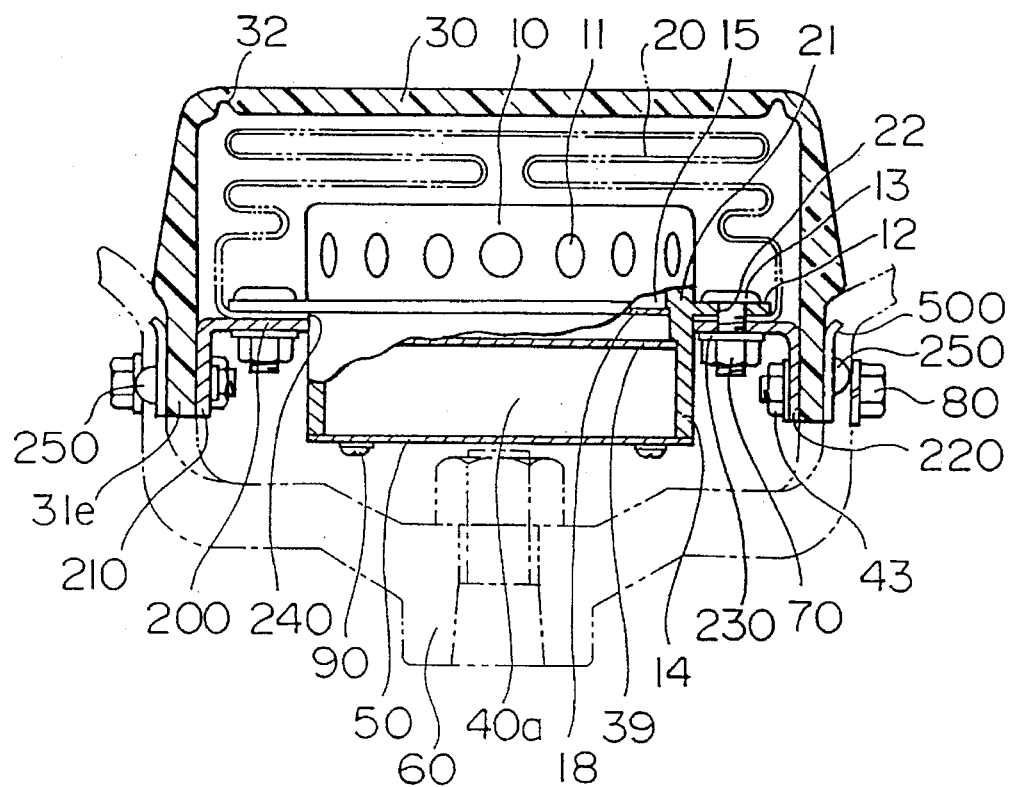
FIG. 15 is a cross-sectional view showing a ninth embodiment of the invention.

FIG. 15 is a cross-sectional view showing the ninth embodiment. In FIG. 15, the same reference numerals as those in FIG. 1 denote common component parts. In the ninth embodiment, a housing 44 of an ECU 40 is integrally formed with an inflater 10.

Referring to FIG. 15, a bag 20 which inflates for protecting a person on board of a vehicle includes an insertion hole 21 in which the inflater 10 is inserted, and a plurality of fixing holes 22. The insertion hole 21 is formed in the bottom of the bag 20, and the fixing holes 22 are formed around the hole 21. The inflater 10 which generates gas and develops the bag 20 is provided with a plurality of gas injection holes 11 and a flange portion 12 including a plurality of fastening bolts 13. By use of nuts 70, the bag 20 is fastened between this flange portion 12 and a back plate 200 which will be described later.

Figure 16:
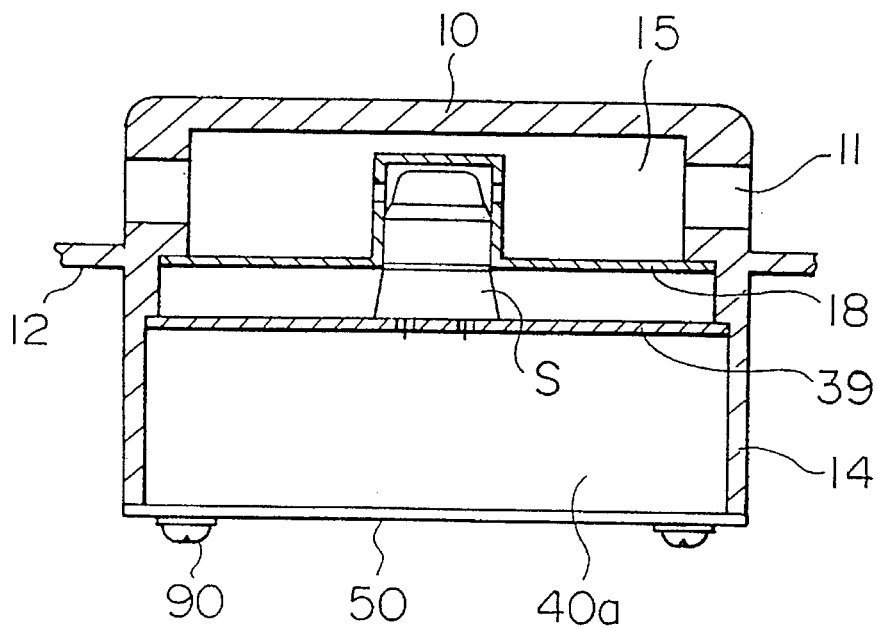
FIG. 16 is a partial enlarged cross-sectional view showing another embodiment of an inflater according to the invention.

As shown in FIG. 16, the housing 14 of the inflater 10 is divided into a reaction chamber 15 and an ECU chamber 40a by means of a partition plate 18. A known gas generating agent, a priming charge, a squib, a filter and so forth are provided in this reaction chamber 15 as an inflater for an air bag. The ECU chamber 40a includes an acceleration sensor for detecting a collision of the vehicle, and a control circuit for performing collision judgement and so forth on the basis of signals from the sensor. This control circuit is provided on a circuit board 39 fixed on the housing 14 of the inflater 10 by screw-fasteners (not shown). Further, the ECU chamber 40a is sealed by fastening a cover 50 on the housing 14 of the inflater 10 by screw-fasteners 90.

A hole (not shown) is formed substantially in the center of the partition plate 18, and squib (initiator element) terminals of the inflater 10 and the circuit board 39 are connected through connector cables or by soldering, thereby electrically connecting the inflater 10 and the ECU chamber 40a.

In this embodiment, the squib S is electrically connected to the circuit board 39 by soldering or the like and secured in this state before it is incorporated in the inflater 10. When the circuit board 39 is provided in a predetermined position in the housing 14, the squib S is received in the inflater 10 at the same time. After that, the cover 50 is fastened on the housing 14 by the screw-fasteners 90.

Thus, the inflater 10 and the squib S can be kept separated until just before the assembly of the device is completed, thereby improving the safety.

Moreover, the squib S and the circuit board 39 can be attached to the housing 14 in one step, thereby enhancing the operational efficiency.

A hole 240 in which the housing 14 of the inflater 10 is inserted is formed substantially in the center of the back plate 200, and also, a plurality of holes 230 are formed around the hole 240 so as to fix the housing 14 including the ECU chamber 40a by the fastening bolts 13 and the nuts 70. Nuts 43 for fastening the back plate 200 on a steering wheel 60 are welded or integrally formed on an outer peripheral portion 210 of the back plate 200, in which a plurality of holes 220 are formed for fixing the back plate 200, the pad 30 and a retainer 500 by rivets 250. In this embodiment, fixing portions 31e of the pad 30 have a flat shape.

The air bag device having the above-described structure is assembled in the following manner.

First, the inflater 10 is inserted from the insertion hole 21 in the bottom of the bag 20, and the fastening bolts 13 provided on the flange portion 12 of the inflater 10 are fitted through the fixing holes 22 of the bag 20 and the holes 230 of the back plate 200. At this time, the bag 20 is folded into a shape generally fitted to the internal shape of the pad 30. Then, while the bag 20 is held between the housing 14 of the inflater 10 and the back plate 200, the inflater 10 is fixed on the back plate 200 by tightening the nuts 70.

Subsequently, the pad 30 is placed over the bag 20, and the outer peripheral portion 210 of the back plate 200, the pad 30 and the retainer 500 are fixed by the rivets 250, thereby completing an air bag module. Further, this air bag module is secured on the steering wheel 60 by attachment bolts 80 and the nuts 43.

As a result, the air bag module can be remarkably reduced in size, and also, the number of component parts and the number of assembling steps can be largely decreased.

A tenth embodiment of the invention will now be described.

Figure 17:
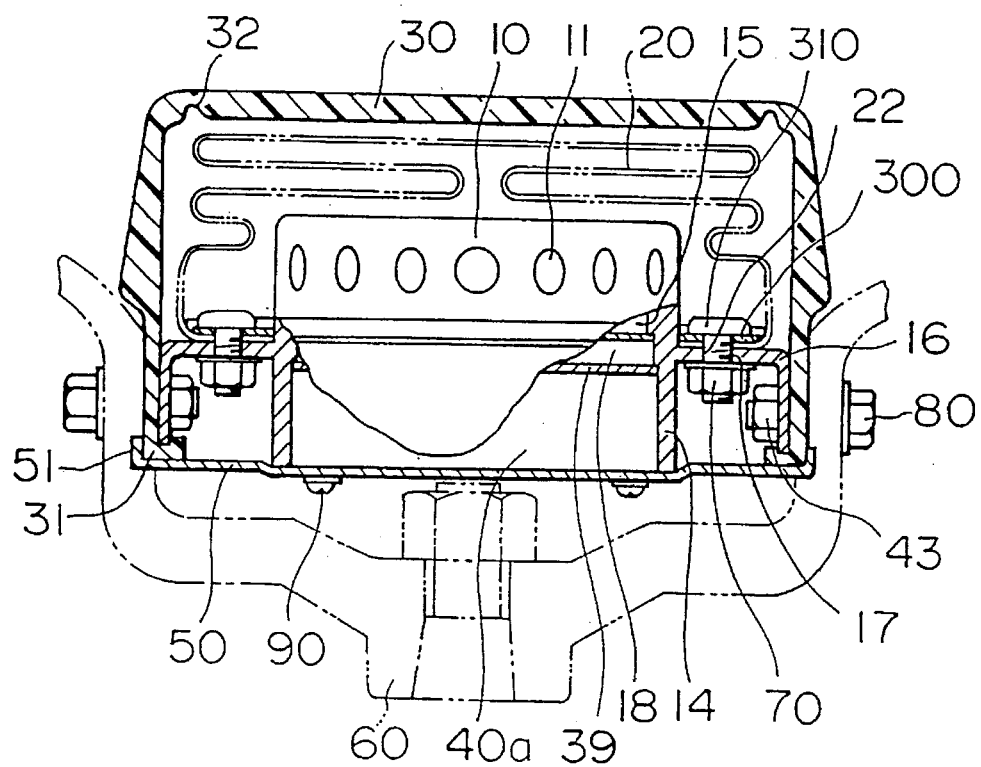
FIG. 17 is a cross-sectional view showing a tenth embodiment of the invention.

FIG. 17 is a cross-sectional view showing the tenth embodiment. In FIG. 17, the same reference numerals as those in FIG. 1 or 16 denote common component parts.

In the tenth embodiment, a housing 14 of an inflater 10 is integrally formed with a back plate for fixing a pad 30 on a steering wheel 60. A bag 20 is clamped between a retainer ring 300 including a plurality of fastening bolts 310 and a flange portion 16 of the housing 14 of the inflater 10. The fastening bolts 310 provided on the retainer ring 300 through holes 17 formed in the flange portion 16 and fixing holes 22 formed in the bag 20 are secured by tightening nuts 70.

Thus, the cone depth can be decreased to the minimum in substantially the same manner as the first embodiment, and also, the assembling efficiency can be improved to a greater degree than the first embodiment.

An eleventh embodiment of the invention will now be described.

Figure 18:
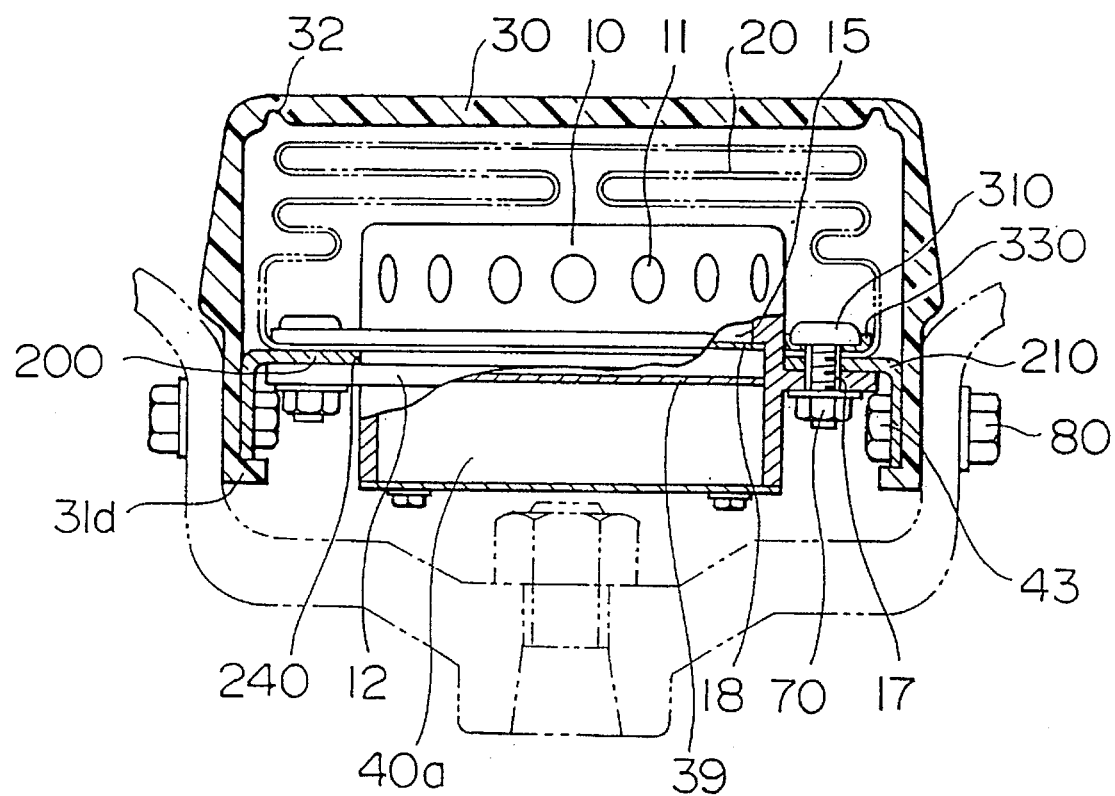
FIG. 18 is a cross-sectional view showing an eleventh embodiment of the invention.

FIG. 18 is a cross-sectional view showing the eleventh embodiment. In FIG. 18, the same reference numerals as those in FIG. 1 or 16 denote common component parts.

This eleventh embodiment is designed in such a manner as to perform attachment of an inflater 10 in the final step, thereby improving safety during the assembly.

More specifically, the assembling procedures of the eleventh embodiment are as follows: First, a bag 20 is clamped between a back plate 200 and a retainer ring 300 and fastened by rivets or the like (not shown). In this state, the bag 20 is folded and covered with a pad 30, and fixing portions 31d are fitted on and attached to the back plate 200.

Subsequently, in this state, the inflater 10 is inserted in a hole 240 of the back plate 200. Then, fastening bolts 310 of the retainer ring 300 are fitted in a plurality of fixing holes 17 formed in a flange portion 12 of the inflater 10, and tightened by nuts 70. As a result, the inflater 10 is attached, and also, the bag 20 is fastened reliably.

Thus, the attachment of the inflater 10 is performed in the final step so that safety during the assembly of an air bag module can be enhanced.

In each of the above-described embodiments, a bag 20 is folded in the following manner.

Figure 19:
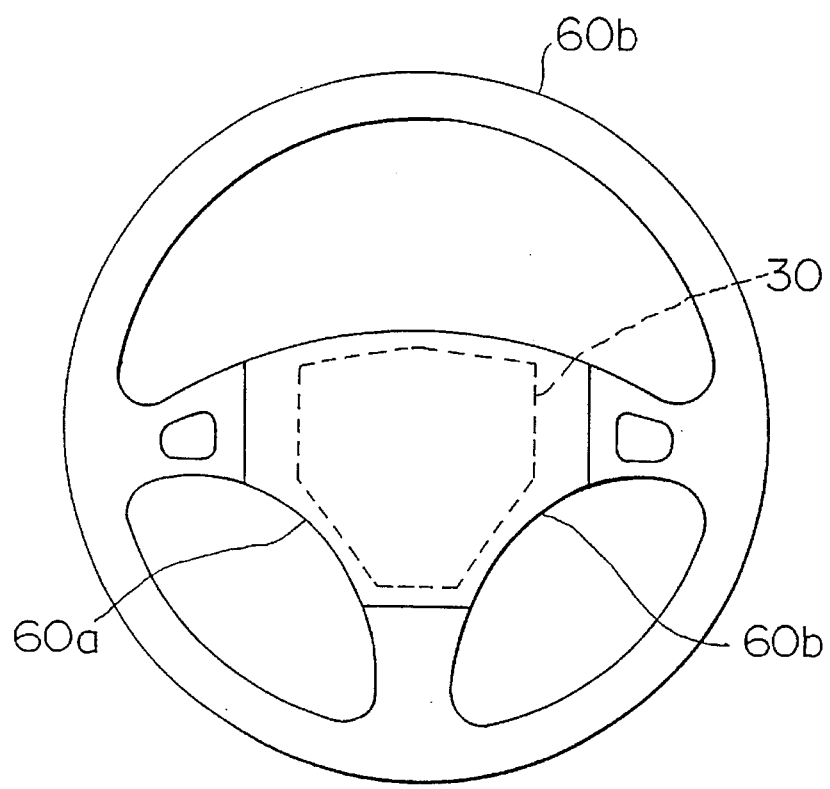
FIG. 19 is a diagram schematically showing the structure of a three-spoke type steering wheel to which an air bag device according to the invention is attached.
Figure 20:
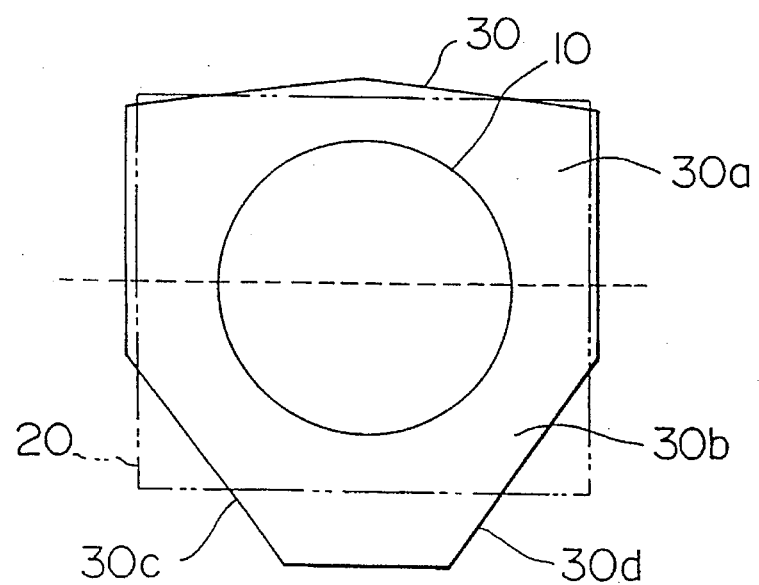
FIG. 20 is a diagram for explaining the positional relationship between an internal shape of a pad and an inflater in the three-spoke type steering wheel.

FIG. 19 is a schematic structural view showing a three-spoke type steering wheel to which an air bag device is attached, and FIG. 20 is a diagram for explaining the positional relationship between an internal shape of a pad and an inflater.

The three-spoke type steering wheel 60b has a shape shown in FIG. 19, and joint portions 60a of spokes have smoothly curved shapes. Consequently, the pad 30 of the air bag device must be formed in such a manner that pad end portions 30c, 30d are inclined, as shown in FIG. 20.

Generally, the bag 20 is folded in a rectangular shape and attached to the center of the inflater 10. Therefore, considering the enclosure effectiveness of the bag 20, the center of the inflater 10 is located to make an upper portion area 30a of the pad 30 substantially equal to a lower portion area 30b so that the bag 20 can be enclosed compactly.

Figure 21:
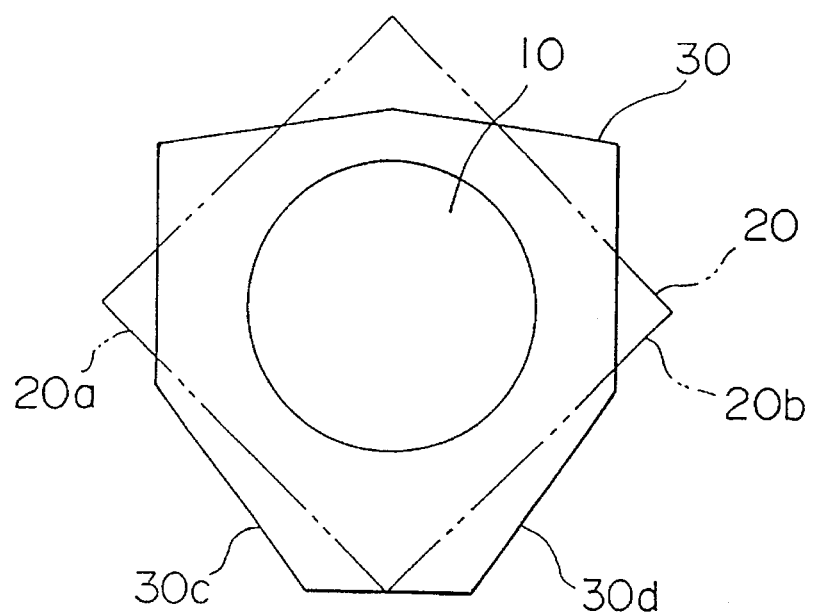
FIG. 21 is a diagram for explaining a location method of a bag in the three-spoke type steering wheel.
Figure 22:
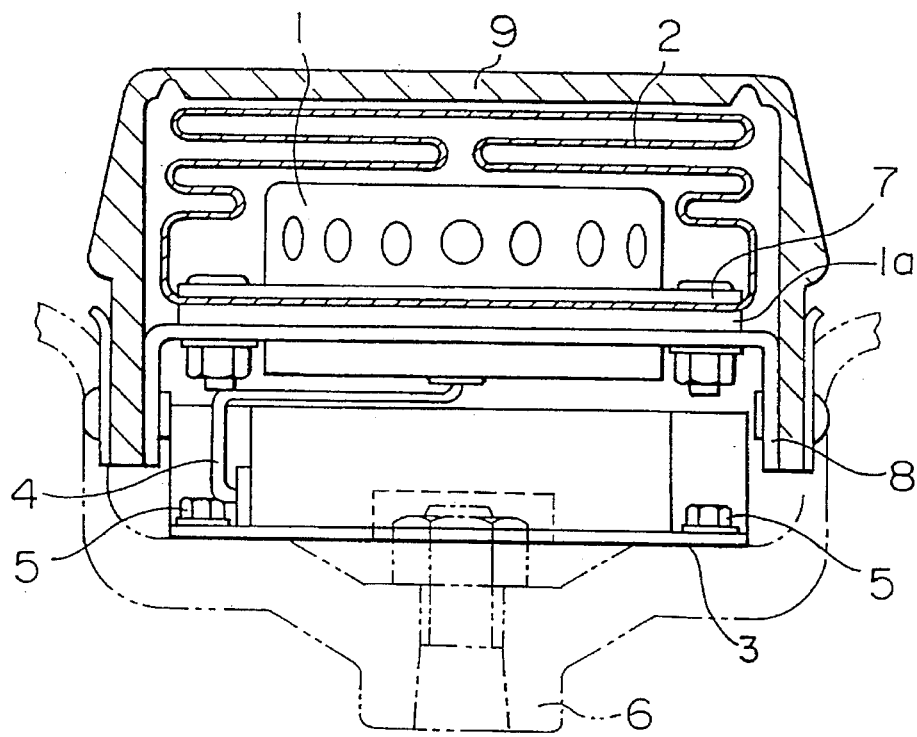
FIG. 22 is a cross-sectional view showing the structure of a conventional air bag device.

For this reason, as shown in FIG. 21, the pad 30 is attached in such a manner that sides 20a, 20b of the bag 20 folded in the rectangular shape extend substantially in parallel to the inclined end portions 30c, 30d of the pad 30, thereby enabling compact enclosure of the bag 20.

Figure 25:
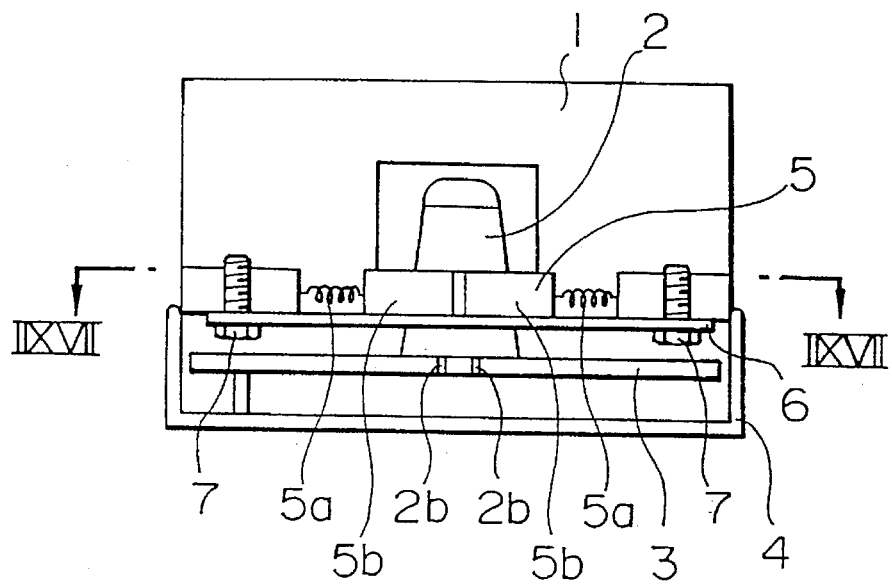
FIG. 25 is a diagram schematically showing the internal structure of an inflater which is another embodiment of the invention.

FIG. 25 is a diagram schematically showing an internal structure of an inflater which is one embodiment of the present invention. As shown in FIG. 25, electric connection terminals 2b of a squib 2 having a generally cylindrical shape are directly bonded on an ECU circuit board 39 by soldering or the like, and further, the ECU circuit board 39 is fixed on a casing 4.

A holder member 5 (equivalent to a retainer member) consisting of spring portions 5a and sliding portions 5b is provided on the lower surface of an inflation element 1 in order to attach the squib 2 and to maintain the pressure of gas when it is generated.

Figure 27:
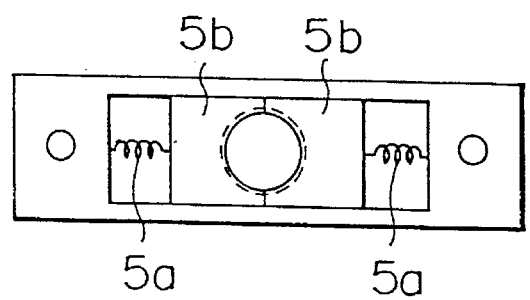
FIG. 27 is a cross-sectional view showing holder members in the embodiment shown in FIG. 25, taken along the line IIXVII—IIXVII.

Each of the spring portions 5a of the holder member 5 is connected to the inflation element 1 at one end and to the sliding portion 5b at the other end. The surfaces of the sliding portions 5b which face the inflation element 1 are fitted close to a housing of the inflation element 1 so as to prevent the pressure of gas generated from the inflation element 1 from escaping toward the casing 4. Also, as shown in FIG. 27 which is a cross-sectional view of FIG. 25, the sliding portions 5b have semicircular ends in accordance with the cross-sectional configuration of the squib 2.

A plate 6 includes a hole in which the squib 2 is inserted. After the holder member 5 is set in the inflation element 1, the plate 6 is fastened by bolts 7.

Figure 26:
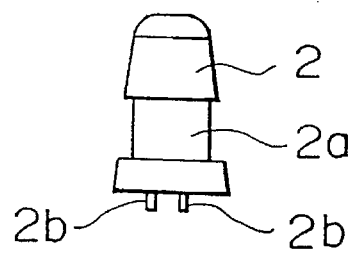
FIG. 26 is a diagram schematically showing the structure of a squib.

As shown in FIG. 26, the squib 2 includes a recessed portion 2a which is held by the sliding portions 5b of the holder member 5. The squib 2 is disposed at a predetermined position in the inflation element 1 when the squib 2 is held by the sliding portions 5b of the holder member 5.

The attachment procedures of the squib 2 and the ECU circuit board 39 to the inflation element 1 in the above-described structure will now be described.

First, the holder member 5 is provided on the lower surface of the inflation element 1, and the spring portions 5a of the holder member 5 are bonded to the inflation element 1. Then, the holder member 5 is interposed between the inflation element 1 and the plate 6, and the plate 6 is fastened on the inflation element 1 by the bolts 7.

Next, while pressing the head (an ignition portion) of the squib 2 toward the holder member 5, the squib 2 is inserted in the inflation element 1 and secured by closely fitting the sliding portions 5b around the recessed portion 2a of the squib 2. Thereafter, the electric connection terminals 2b of the squib 2 are directly bonded on the ECU circuit board 39 by soldering or the like, and the casing 4 is placed on the inflation element 1 and secured by welding, press-fitting, caulking or the like so that the casing 4 does not come off.

In the above-described embodiment, the holder member 5 is provided on the lower surface of the inflation element 1 so that the electric connection terminals 2b of the squib 2 can be directly bonded on the ECU circuit board 39. Consequently, it is not necessary to dispose connector cables for electrically connecting the squib 2 with the ECU circuit board 39 in a pad 30. By eliminating a space for disposing the connector cables, an air bag device can be reduced in size.

Another embodiment will be described.

Figure 28:
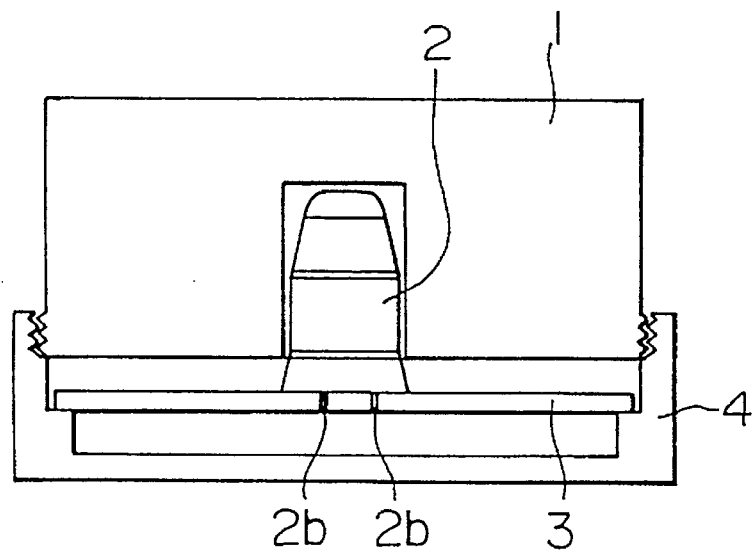
FIG. 28 is a diagram schematically showing the internal structure of an inflater which is another embodiment of the invention.

In the embodiment described before, the squib 2 is fixed at the predetermined position in the inflation element 1 by means of the holder member 5. In this embodiment, however, as shown in FIG. 28, screw threads 8a are formed on a portion of an inflation element 1 and a portion of a squib 2 where they are fitted with each other, and screw threads 8b are formed on a portion of the inflation element 1 and a portion of a casing 4 where they are fitted with each other. By tightening these members through the screw threads 8a, 8b, the squib 2 can be secured at the predetermined position in the inflation element 1.

Thus, electric connection terminals 2b of the squib 2 can be directly bonded on an ECU circuit board 39, so that an air bag device can not only be reduced in size but also be improved in respect of the assembling efficiency and the number of component parts.

A still other embodiment will be described.

Figure 29:
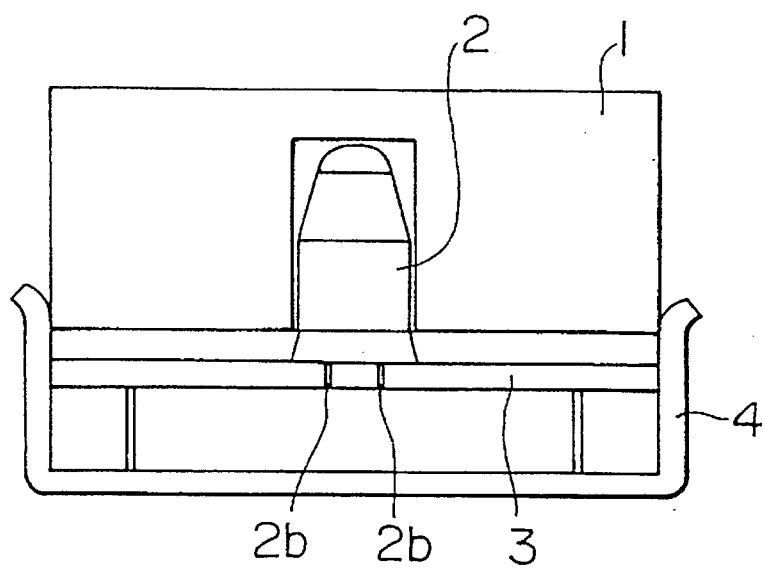
FIG. 29 is a diagram schematically showing the internal structure of an inflater which is a still other embodiment of the invention.

In the embodiment described before, the squib 2 is fixed at the predetermined position in the inflation element 1 by means of the holder member 5. In this embodiment, however, as shown in FIG. 29, a squib 2 is fixed at a predetermined position in an inflation element 1 by press-fitting the squib 2 in the inflation element 1. A casing 4 is fixed by welding with the inflation element 1. Thus, electric connection terminals 2b of the squib 2 can be directly bonded on an ECU circuit board 39.

Figure 30:
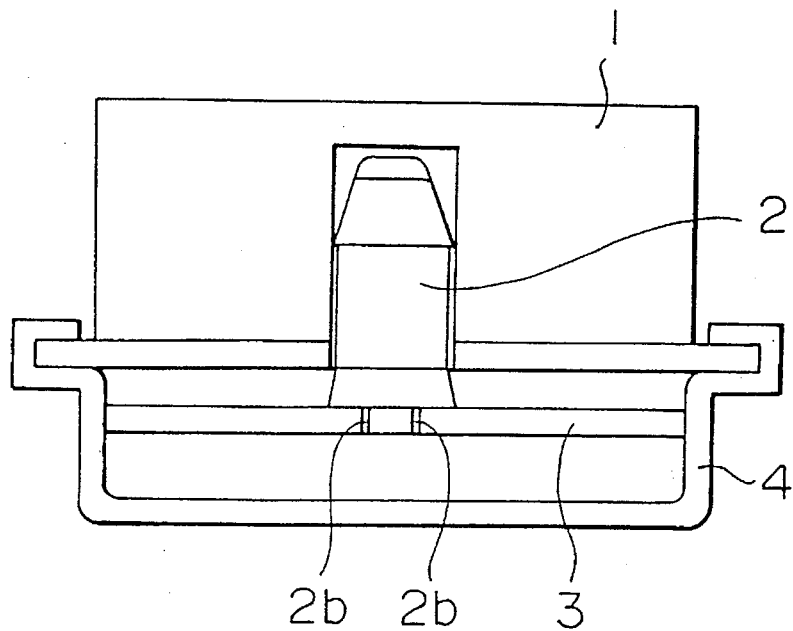
FIG. 30 is a diagram schematically showing the structure of another embodiment of the invention.
Figure 34:
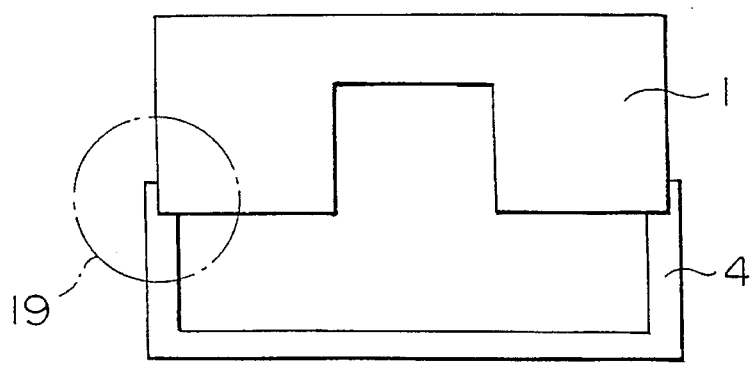
FIG. 34 is a diagram schematically showing the structure of a still other embodiment of the invention.

In the embodiment shown in FIG. 29, the casing 4 and the inflation element 1 are secured by welding. However, as shown in FIG. 30, a casing 4 and an inflation element 1 may be caulked. Further, as indicated by a portion 19 in FIG. 34, a casing 4 and an inflation element 1 may be press-fitted with each other.

Figure 31:
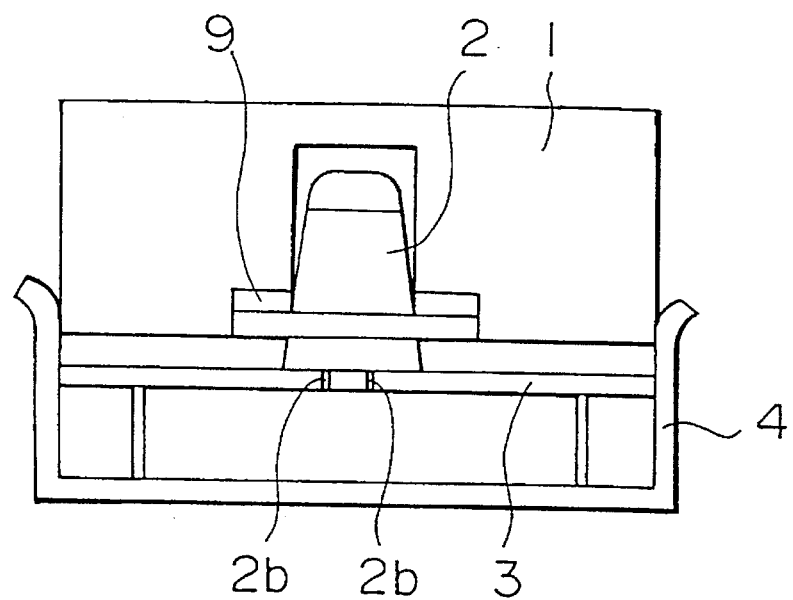
FIG. 31 is a diagram schematically showing the internal structure of an inflater which is another embodiment of the invention.

In the embodiment described before, the squib 2 is fixed at the predetermined position in the inflation element 1 by means of the holder member 5. In one embodiment shown in FIG. 31, however, an elastic member 9 is interposed between an inflation element 1 and a squib 2, and the squib 2 is fixed at a predetermined position in the inflation element 1.

Thus, electric connection terminals 2b of the squib 2 can be directly bonded on an ECU circuit board 39, so that an air bag device can be reduced in size. Also, the pressure produced when the squib 2 is ignited can be maintained.

Figure 32:
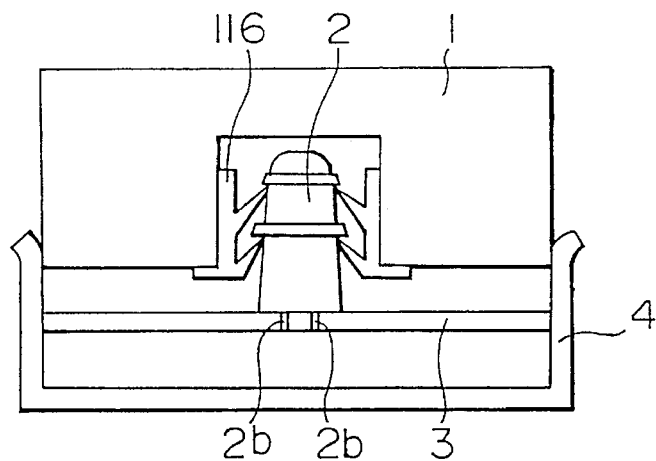
FIG. 32 is a diagram schematically showing the structure of another embodiment of the invention.

Similarly, as shown in FIG. 32, a stopper 116 made of an elastic material may be interposed between an inflation element 1 and a squib 2. As a result, the above-described advantages can be obtained, and also, the squib 2 can be prevented from coming off when the squib 2 is ignited.

Figure 33:
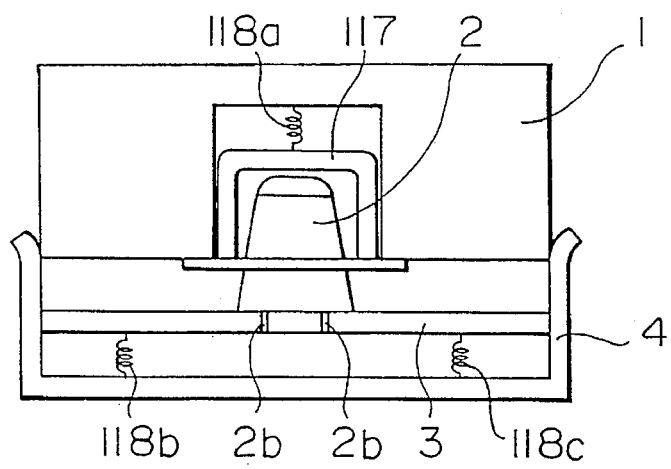
FIG. 33 is a diagram schematically showing the internal structure of an inflater which is another embodiment of the invention.

In the embodiment described before, the squib 2 is fixed at the predetermined position in the inflation element 1 by means of the holder member 5. However, one embodiment shown in FIG. 33 includes a retainer member 117 for retaining a squib 2 which is provided in an inflation element 1, and a spring 118a connected to an upper portion of the inflation element 1 at one end and to the retainer member 117 at the other end. Further, springs 118b, 118c are provided between a casing 4 and an ECU circuit board 3.

Thus, the pressure produced when the squib 2 is ignited can be maintained by the retainer member 117, and also, stresses generated when and after the component parts are connected can be lessened by the springs 118a, 118b, 118c.

Needless to say, the present invention is not restricted to the foregoing embodiments and can be realized in various other forms without deviating from the spirits of the embodiments described above.

What is claimed is:

1. An air bag device comprising:

a housing having an electronic control unit control circuit mounting surface monolithically formed with the housing, an inflater mounting surface, and a mounting portion monolithically formed with the outer periphery of the housing;

an inflater for generating gas for expanding a bag, said inflater being disposed directly on the inflater mounting surface of the housing, the inflater having a squib for igniting the inflater;

an acceleration sensor for detecting an acceleration of a vehicle during a collision of the vehicle;

an electronic control unit control circuit for making a collision judgment in response to a signal from the acceleration sensor, said electronic control unit control circuit being mounted on the electronic control unit control circuit mounting surface of the housing, the squib being electrically connected to the electronic control unit control circuit; and a cover-like pad disposed on the housing such that the pad covers the inflater and the bag, the cover-like pad being disposed onto the mounting portion.

2. An air bag device according to claim 1, wherein the mounting portion extends substantially perpendicularly to the inflater mounting surface so that the electronic control unit is surrounded by the mounting portion.

3. An air bag device according to claim 2, wherein the housing has an opening opposite the inflater mounting surface, and wherein said air bag device further comprises a cover which closes the opening and is fixed to said housing.

4. An air bag device according to claim 3, wherein said cover has an outer peripheral bent portion, and said pad is attached to the perpendicular mounting portion of the housing by pressing said pad against the housing by the bent portion.

5. An air bag device according to claim 4, wherein said pad has a projecting end portion which projects toward the bent portion, and said bent portion has an engaging portion which engages with the projecting end portion.

6. An air bag device according to claim 4, wherein the pad has a hole, the bent portion has a projecting portion at a position corresponding to the hole, and said projecting portion is closely fitted in said hole.

7. An air bag device according to claim 4, wherein the pad has a fixing portion which projects toward said housing, and the perpendicular mounting portion of said housing has an end portion contacting with said fixing portion.

8. An air bag device according to claim 1, wherein the inflater has a flange portion, and said bag is clamped and secured between the flange portion and said electronic control unit.

9. An air bag device according to claim 2, wherein the perpendicular mounting portion is constructed and arranged for fixing the housing onto a steering-wheel.

10. An air bag device according to claim 2, wherein the inflater mounting surface has a through hole formed substantially in a center thereof for passing a connector cable therethrough so that a squib in said inflater is electrically connectable to said electronic control unit by the connector cable.

11. An air bag device according to claim 2, wherein the inflater mounting surface has a through hole formed substantially in a center thereof for passing therethrough a connector terminal with a predetermined rigidity such that a squib in said inflater is directly connectable to said electronic control unit.

12. An air bag device according to claim 2, wherein the inflater mounting surface has a through hole formed substantially in a center thereof, and wherein the squib is electrically connected to said electronic control unit, said squib being set into a predetermined position in said inflator and passing through said through hole.

13. An air bag device according to claim 11, wherein the inflater has a flange portion at an outer periphery thereof, said flange portion being fixed to the housing so that the inflater is fixed to the housing.

14. An air bag device comprising:

a housing having a mounting surface monolithically formed with the housing;

an inflater for generating gas for expanding a bag, said inflater being disposed on the housing;

an acceleration sensor for detecting an acceleration of a vehicle during a collision of the vehicle;

an electronic control unit control circuit for making a collision judgment in response to a signal from the acceleration sensor, said electronic control unit control circuit being disposed on the mounting surgace;

a plate having a shoulder portion at an outer periphery of the plate, said housing being fixed to the plate; and a cover-like pad disposed on the shoulder portion so that the pad covers the inflater and the bag, wherein said housing defines gas injection hole through which gas from the inflater is discharged and wherein said mounting surface is constructed and arranged so that the electronic control unit control circuit is substantially adjacent to the inflater.

15. An air bag device according to claim 14, wherein the housing has a flange portion at an outer periphery of the housing extending monolithically from the housing, said flange portion being fixed to the plate.

16. An air bag device comprising:

a housing having a mounting surface monolithically formed with the housing and a mounting portion monolithically formed with the housing, said mounting portion being disposed on the outer periphery of the housing;

an inflater for generating gas for expanding a bag, said inflater being disposed on the housing;

an acceleration sensor for detecting an acceleration of a vehicle during a collision of the vehicle;

an electronic control unit for making a collision judgment in response to a signal from the acceleration sensor, said electronic control unit being disposed on the mounting surface;

a cover-like pad disposed on the mounting portion so that the pad covers the inflater and the bag, wherein said housing defines a gas injection hole through which gas from the inflater is discharged and wherein said mounting surface is constructed and arranged so that the electronic control unit is substantially adjacent to the inflater.

17. An air bag device according to claim 16, further comprising an electronic circuit substrate on which the electronic control unit is disposed, the electronic circuit substrate being fixed directly to the mounting surface of the housing, and comprising a squib for igniting the inflater, said squib being electrically connected to the electronic circuit substrate.

18. An air bag device according to claim 1, wherein the inflater mounting surface and the electronic control unit control circuit mounting surface face in opposite directions.

\* \* \* \* \*